United States Patent
Wu

(10) Patent No.: US 12,532,164 B2
(45) Date of Patent: Jan. 20, 2026

(54) MANAGING SECURITY KEYS IN A COMMUNICATION SYSTEM

(71) Applicant: GOOGLE LLC, Mountain View, CA (US)

(72) Inventor: Chih-Hsiang Wu, Taoyuan (TW)

(73) Assignee: GOOGLE LLC, Mountain View, CA (US)

( * ) Notice: Subject to any disclaimer, the term of this patent is extended or adjusted under 35 U.S.C. 154(b) by 132 days.

(21) Appl. No.: 17/635,374

(22) PCT Filed: Aug. 14, 2020

(86) PCT No.: PCT/US2020/046421
§ 371 (c)(1),
(2) Date: Feb. 14, 2022

(87) PCT Pub. No.: WO2021/030708
PCT Pub. Date: Feb. 18, 2021

(65) Prior Publication Data
US 2022/0345296 A1    Oct. 27, 2022

Related U.S. Application Data

(60) Provisional application No. 62/886,701, filed on Aug. 14, 2019.

(51) Int. Cl.
*H04W 12/041* (2021.01)
*H04L 9/08* (2006.01)
(Continued)

(52) U.S. Cl.
CPC ......... *H04W 12/041* (2021.01); *H04L 9/0819* (2013.01); *H04L 9/0861* (2013.01);
(Continued)

(58) Field of Classification Search
CPC ....... H04L 9/08; H04L 9/0819; H04L 9/0861; H04L 9/14; H04W 76/27; H04W 76/19;
(Continued)

(56) References Cited

U.S. PATENT DOCUMENTS

| 2008/0076404 A1* | 3/2008 | Jen ................... H04W 76/19 370/216 |
| 2016/0191471 A1 | 6/2016 | Ryoo et al. |

(Continued)

FOREIGN PATENT DOCUMENTS

| CN | 109691155 A | 4/2019 |
| KR | 2020-0018543 A | 2/2020 |

(Continued)

OTHER PUBLICATIONS

First Examination Report for India Application No. 202247012470, dated Jul. 13, 2022.

(Continued)

*Primary Examiner* — Shaqueal D Wade-Wright
(74) *Attorney, Agent, or Firm* — MARSHALL, GERSTEIN & BORUN LLP

(57) ABSTRACT

A security key management method can be implemented a user equipment (UE) capable of concurrent communication with a master node (MN) and a secondary node (SN). The method includes transitioning (504) from a connected state in which the UE communicates with the MN using a first security key and with the SN using a second security key (502), to an inactive state in which a radio connection between the UE and a radio access network (RAN) is suspended. The method further includes performing a procedure for transitioning from the inactive state to the connected state, including generating a new RAN key $K_{SN}$ (Continued)

corresponding to the SN (506) and generating a new security key for communicating with the SN based on at least the new RAN key $K_{SN}$ (508).

20 Claims, 5 Drawing Sheets

(51) Int. Cl.
    *H04W 12/033*     (2021.01)
    *H04W 12/0433*     (2021.01)
    *H04W 12/106*     (2021.01)
    *H04W 12/04*     (2021.01)
    *H04W 76/15*     (2018.01)
    *H04W 76/27*     (2018.01)

(52) U.S. Cl.
    CPC ..... *H04W 12/033* (2021.01); *H04W 12/0433* (2021.01); *H04W 12/106* (2021.01); *H04W 12/04* (2013.01); *H04W 76/15* (2018.02); *H04W 76/27* (2018.02)

(58) Field of Classification Search
    CPC ... H04W 76/15; H04W 12/04; H04W 12/041; H04W 12/043; H04W 12/0433; H04W 12/033; H04W 12/106
    See application file for complete search history.

(56) References Cited

U.S. PATENT DOCUMENTS

| | | | | |
|---|---|---|---|---|
| 2019/0124710 | A1* | 4/2019 | Stattin | H04W 76/19 |
| 2019/0357109 | A1* | 11/2019 | Hong | H04W 76/19 |
| 2020/0120499 | A1 | 4/2020 | Norrman et al. | |
| 2020/0145817 | A1* | 5/2020 | Liu | H04W 12/037 |
| 2020/0214070 | A1* | 7/2020 | Ingale | H04W 12/106 |
| 2021/0152350 | A1* | 5/2021 | Al | H04W 76/19 |
| 2022/0345970 | A1* | 10/2022 | Kim | H04W 12/041 |

FOREIGN PATENT DOCUMENTS

| | | |
|---|---|---|
| WO | WO-2019/099550 A1 | 5/2019 |
| WO | WO-2020/029165 A1 | 2/2020 |

OTHER PUBLICATIONS

International Search Report and Written Opinion for Application No. PCT/US2020/046421, dated Nov. 18, 2020.
ZTE Corporation et al., "Resumption off SN Terminated MCG Bearer," 3GPP Draft (2018).
"5G; Security Architecture and Procedures for 5G System (3GPP TS 33.501 version 15.5.0 Release 15)," ETSI Tecnical Specification (2019).
Ericsson, "RRC handling of SN Counter for NE-DC and NN-DC" 3GPP TSG-RAN WG2#103(Oct. 8, 2018).
First Office Action for Chinese Application No. 202080070542.X, dated Jul. 25, 2024.
"5G; Security Architecture and Procedures for 5G System (3GPP TS 33.501 version 15.2.0 Release 15)," ETSI TS 133 501 (2018).
Ericsson, "Introduction of late drop NGEN-DC, NE-DC and NR-DC," 3GPP TSG-RAN2 Meeting #105 (2018).
Huawei, "Security Mechanisms for Dual Connectivity Architecture for MR-DC with 5GC," 3GPP TSG-SA WG3 (Security) Meeting #91Bis (2018).

\* cited by examiner

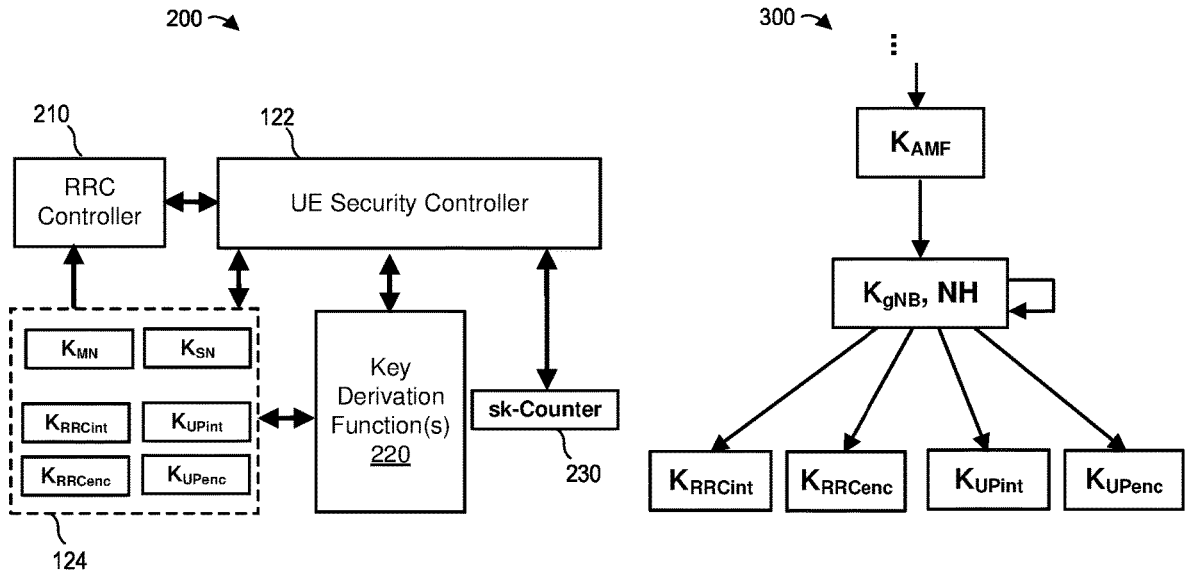
Figure 2A
Figure 3
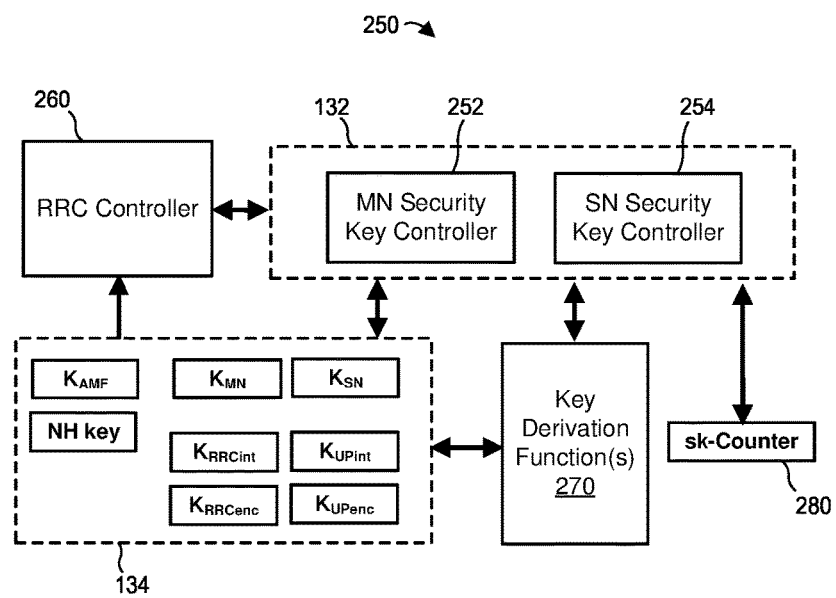
Figure 2B

MANAGING SECURITY KEYS IN A COMMUNICATION SYSTEM

FIELD OF THE DISCLOSURE

This disclosure relates generally to wireless communications and, more particularly, to methods and apparatus to manage security keys for secure communication.

BACKGROUND

To protect confidentiality and integrity of traffic (i.e., prevent inspection in the event of unauthorized interception and alteration, respectively), network devices operating in cellular networks utilize various security keys. For example, a 5G cellular network supports a hierarchy of security keys for communicating with certain network nodes (e.g., 5G Nodes B (gNBs) operating in the radio access network (RAN) or an Access and Mobility Management Function (AMF) operating in a core network), communicating certain types of information (e.g., control-plane data, user-plane data), and providing a particular security feature (e.g., confidentiality protection through encryption, integrity protection). In some cases, a user device (or user equipment, commonly denoted by acronym "UE") can concurrently utilize resources of multiple base stations and apply respective security keys to these resources.

For example, a UE can communicate in so-called dual connectivity (DC) with base stations that support the same radio access technology (RAT) or different RATs, in which case the DC is referred as multi-radio DC (MR-DC). One base station in these cases operates as a master node (MN), and the other base station operates as a secondary node (SN). Generally speaking, the MN can provide a control plane connection and a user plane connection to a core network (CN), whereas the SN generally provides a user plane connection. The cells associated with the MN define a master cell group (MCG), and the cells associated with the SN define a secondary cell group (SCG). The UE and the base stations MN and SN can use signaling radio bearers (SRBs) to exchange radio resource control (RRC) messages, as well as non-access stratum (NAS) messages.

There are several types of SRBs that a UE can use when operating in DC. SRB1 and SRB2 resources allow the UE and the MN to exchange RRC messages related to the MN, and to embed RRC messages related to the SN, and can be referred to as MCG SRBs. SRB3 resources allow the UE and the SN to exchange RRC messages related to the SN, and can be referred to as an SCG SRB. Split SRBs allow the UE to exchange RRC messages directly with the MN by using radio resources of the MN, the SN, or both of the MN and SN. Further, the UE and the base stations MN and SN use data radio bearers (DRBs) to transport data on a user plane. DRBs terminated at the MN and using the lower-layer resources of only the MN can be referred to as MCG DRBs, DRBs terminated at the SN and using the lower-layer resources of only the SN can be referred to as SCG DRBs, and DRBs terminated at the MN but using the lower-layer resources of both the MN and the SN can be referred to as split DRBs.

To implement security, the UE can use such keys as: $K_{UPenc}$ to encrypt user-plane data transmitted over a DRB, $K_{UPint}$ to protect integrity of user-plane data transmitted over a DRB, $K_{RRCenc}$ to encrypt RRC data transmitted over a SRB, and $K_{RRCint}$ to protect integrity of RRC data transmitted over an SRB. The UE and the gNB can derive these keys at least partially from RAN keys associated with RAN nodes. Thus, a gNB operating in a RAN can be associated with a key $K_{gNB}$, an eNB operating in the RAN can be associated with a key $K_{eNB}$, etc. In accordance with the security key hierarchy, network devices in turn can generate RAN keys based on other keys that the core network can control (e.g., $K_{AMF}$), based on previous values of the RAN keys, RAN-level counters, etc.

Because a UE communicates in DC using multiple DRBs and SRBs, the UE in some cases must simultaneously manage multiple sets of security keys. In particular, the UE can use security keys specific to the MN as well as security keys specific to the SN. When the UE and the MN suspend the radio connection between the UE and the MN and the SN upon transitioning from the connected state to the inactive state, the UE according to 3GPP TS 38.331 version 15.5.1 retains a portion of the configuration as a stored access stratum (AS) context. The retained portion of the configuration pertains to the MN and the SN.

However, when the UE resumes the radio connection upon transitioning from the inactive state back to the connected state, the UE and the RAN do not always properly align the security keys for the DRBs and the SRBs. More particularly, the UE and the SN may use different encryption keys for an SN-terminated radio bearer. As a result, the UE and the SN cannot correctly support encryption after transitioning back to the connected state.

SUMMARY

Generally speaking, when a UE transitions from an inactive state of the protocol for controlling radio resources (e.g., RRC) to the connected state to resume communications with an MN and an SN, the UE and the RAN (the MN and/or the SN) implement the techniques of this disclosure to ensure that the UE and the SN apply the same one or more encryption keys to traffic on the SN-terminated radio bearer.

To this end, the UE generates a new $K_{SN}$ key (which can be a $K_{gNB}$ or a $K_{eNB}$, depending on the type of the base station). The UE then derives a new security key, such as $K_{UPenc}$, based at least in part on the new $K_{SN}$ key, for communicating with the SN. To derive the new $K_{SN}$ key, the UE can use the current value of the counter associated with an initial configuration of security for a radio bearer terminated at the SN, e.g., the sk-Counter. The UE in at least some of the implementations can also generate a new $K_{MN}$ key and derives a new security key for communicating with the MN. Further, the UE can generate the new $K_{SN}$ key based at least in part on the new $K_{MN}$ key.

The MN and the SN in this scenario generate a new $K_{MN}$ key based at least in part on the previous value of the $K_{MN}$ key (or simply "the previous $K_{MN}$ key"), generate a new $K_{SN}$ key based at least in part on the new value of the $K_{MN}$ key, and derive a new security key for the UE to communicate with the SN based at least in part on the new $K_{SN}$ key.

In an example scenario, a UE capable of concurrent communication with an MN and an SN transitions from a connected state in which the UE communicates with the MN using a first security key and with the SN using a second security key, to an inactive state in which a radio connection between the UE and a RAN is suspended. The UE then performs a procedure for transitioning from the inactive state to the connected state. The procedure includes generating a new RAN key $K_{SN}$ corresponding to the SN, and generating a new security key for communicating with the SN based on at least the new RAN key $K_{SN}$.

An example embodiment of this techniques is a UE comprising processing hardware configured to implement the method above.

In another example scenario, a RAN that includes a first base station operating as an MN and a second base station operating as an SN causes a UE to transition from a connected state in which the UE communicates with the MN using a first security key and with the SN using a second security key, to an inactive state in which a radio connection between the UE and the RAN is suspended. The RAN subsequently generates a new RAN key $K_{MN}$ corresponding to the MN, generates a new RAN key $K_{SN}$ corresponding to the SN, based on at least the new RAN key $K_{MN}$, and generates a new security key for communicating between the UE and the SN, based on at least the new RAN key $K_{SN}$.

Another example embodiment of these techniques is a RAN including a first base station coupled to a CN and a second base station communicatively coupled to the CN and the first base station. The RAN is configured to implement the method above.

BRIEF DESCRIPTION OF THE DRAWINGS

FIG. 2A is a block diagram of an example security management system the UE of FIG. 1 can implement;

FIG. 2B is a block diagram of an example security management system the base station of FIG. 1 can implement;

FIG. 3 illustrates a fragment of a security key hierarchy according to which the devices of FIG. 1 can operate;

DETAILED DESCRIPTION OF THE DRAWINGS

Figure 1:
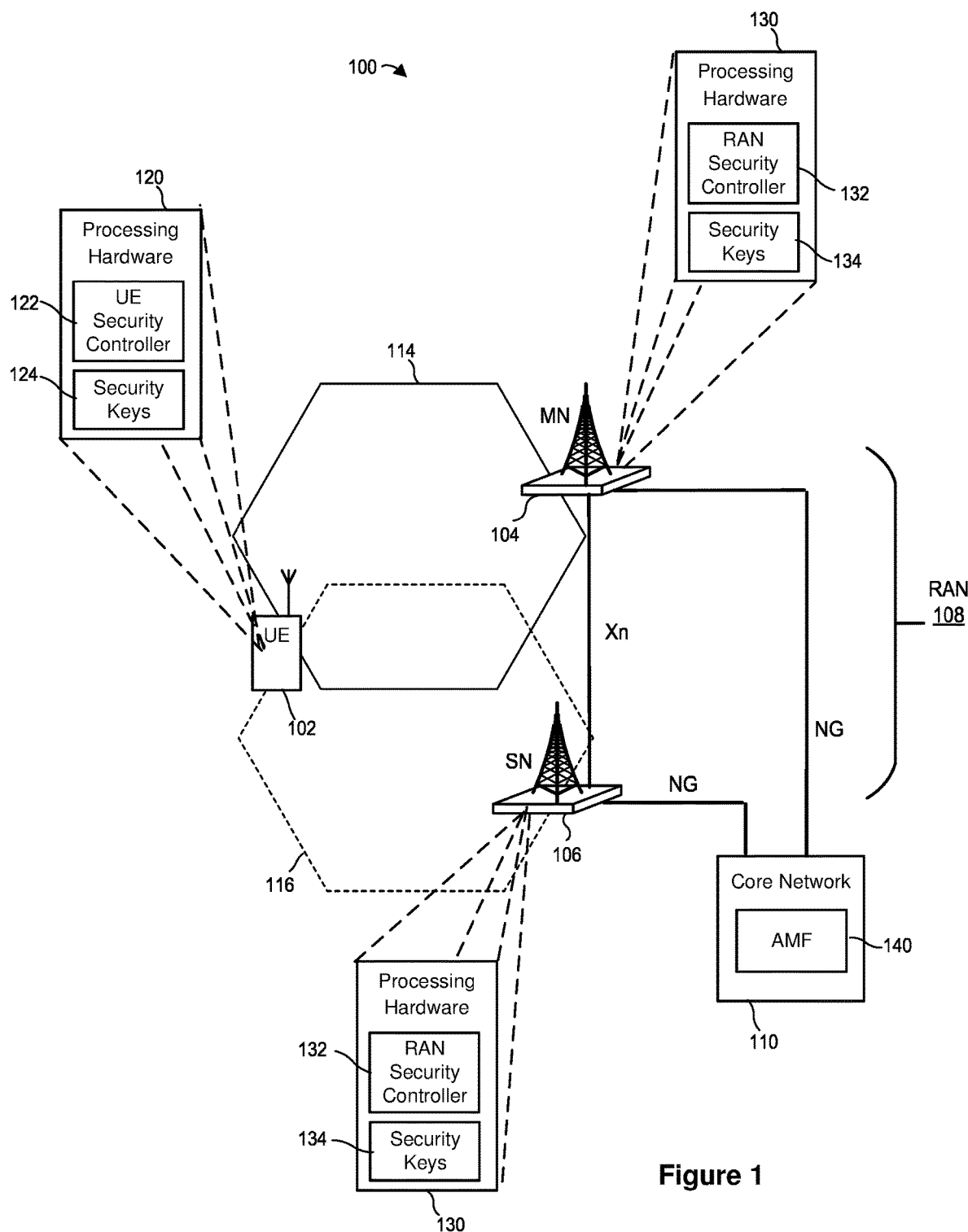
FIG. 1 illustrates an example communication system in which a user equipment (UE) and base stations operating as a master node (MN) and a secondary node (SN), respectively, in a radio access network (RAN) can manage security keys using the techniques of this disclosure.

FIG. 1 depicts an example wireless communication network 100 in which an example UE 102 operates in dual connectivity with an MN 104 and an SN 106 of a RAN 108. To protect confidentiality and integrity of messages, the UE 102 and the devices operating in the RAN 108 utilize security keys. The UE 102 and the RAN 108 implement the key management techniques of this disclosure, discussed in detail below.

In different configurations of the wireless communication system 100, the MN 104 can be implemented as a master eNB (MeNB) or a master gNB (MgNB) node, the SN 106 can be implemented as a secondary eNB (SeNB) or a secondary gNB (SgNB) node, and the UE 102 communicates with the MN 104A and SN 106A via the same RAT such as EUTRA or NR, or different RATs. In some cases, the MeNB or SeNB is implemented as an ng-eNB rather than an eNB. When the MN 104 is an Mng-eNB and the SN 106 is a SgNB, the UE 102 may be in next generation (NG) EUTRA-NR DC (NGEN-DC) with the Mng-eNB and the SgNB. When the MN 104 is an MgNB and the SN is an SgNB, the UE 102 may be in NR-NR DC (NN-DC) with the MgNB and the SgNB. When the MN 104 is an MgNB and the SN is an Sng-eNB, the UE 102 may be in NR-EUTRA DC (NE-DC) with the MgNB and the Sng-eNB.

The MN 104 and the SN 106 can connect to a CN 110, which can be for example a 5G core network (5GC) or an evolved packet core (EPC). The core network may be equipped with an AMF 140. The MN 104 and the SN 106 accordingly can support an S1 interface to communicate with an EPC or NG interface to communicate with a 5GC. Further, to directly exchange messages during the scenarios discussed below, the MN 104 and the SN 106 can support an Xn interface. The cells 114 associated with the MN 104 define an MCG, and the cells 116 associated with the SN 106 define an SCG.

The UE 102 is equipped with processing hardware 120 that can include one or more general-purpose processors such as central processing units (CPUs) and non-transitory computer-readable memory storing machine-readable instructions executable on the one or more general-purpose processors, and/or special-purpose processing units. The processing hardware 120 in an example implementation includes a UE security controller 122 along with a security key storage 124 which stores one or more security keys on which the UE security controller 122 operates. Other components of the UE 102 that use the security keys and cooperate with the UE security controller 122 are discussed below with reference to FIG. 2A.

Because a base station can operate as an MN or an SN in different scenarios, the MN 104 and the SN 106 can implement similar sets of functions and support both MN and SN operations. As illustrated in FIG. 1, the MN 104 is equipped with processing hardware 130 that can include one or more general-purpose processors such as CPUs and non-transitory computer-readable memory storing machine-readable instructions executable on the one or more general-purpose processors, and/or special-purpose processing units. The processing hardware 130 in an example implementation includes a RAN security controller 132 as well as a security key storage 134 which stores one or more security keys on which the RAN security controller 132 can operate. Other components of the MN 104 that use the security keys and cooperate with the RAN security controller 132 are discussed below with reference to FIG. 2B. The SN 106 has a similar implementation.

The UE 102 in the scenarios discussed below first operates in the connected state and communicates with the MN 104 and the SN 106 using respective security keys. The RAN 108 then causes the UE 102 to transition from the connected state to the inactive state, in which the UE 102 suspends a radio connection between the UE 102 and the RAN 108. When the UE 102 resumes the radio connection with the RAN 108, the UE security controller 122 and the RAN security controller 132 at the SN 106 generate aligned (e.g., identical or having another type of correspondence or dependency) new security keys, so that the UE 102 and the SN 106 can properly process uplink (i.e., traveling from the UE 102 to the RAN 108) and downlink (i.e., traveling from the RAN 108 to the UE 102) messages.

Prior to discussing several example scenarios in which the UE 102, the MN 104, and the SN 106 implement these security key management techniques, example security management systems of the UE 102 and the base stations 104, 106 are briefly considered with reference to FIGS. 2A and 2B. A portion of the security key hierarchy in the wireless communication network 100 is then considered with reference to FIG. 3.

FIG. 2A depicts a block diagram of an example security management system 200 in which the UE security controller 122 of FIG. 1 can operate. The security management system 200 also can include, or cooperate with, an RRC Controller 210. The UE security controller 122 and the RRC controller 210 in operation can access the key storage 124, which in this example implementation stores current values of RAN keys $K_{MN}$ and $K_{SN}$. Depending on the implementation, the key $K_{MN}$ can be a $K_{gNB}$ or a $K_{eNB}$, and the key $K_{SN}$ can be a $K_{gNB}$ or $K_{eNB}$. The UE security controller 122 at some point can apply a Key Derivation Function (KDF) 220 (which can include a set of functions specific to various keys) to the current value of $K_{MN}$ generate a new value of $K_{MN}$. Further, the UE security controller 122 can use the KDF 220 to generate a value of $K_{SN}$ based at least on the current value of $K_{MN}$. In at least some of the implementations, the UE security controller 122 also uses the current value of sk-Counter 280 when generating the value of $K_{SN}$, which the UE 102 can receive from the MN 104 as discussed below.

Further, the UE security controller 122 can use the KDF 220 to generate, using $K_{SN}$, the current values of $K_{RRCint}$ and/or $K_{RRCenc}$ for secure communication of control-plane data with the SN 106 (if SRB3 is configured to the UE 102) and the current values of $K_{UPint}$ and/or $K_{UPenc}$ for secure communication of user-plane data with the SN 106. The UE security controller 122 similarly can use the KDF 220 to generate, using $K_{MN}$, one or more security keys for communicating with the MN 106 (not shown in FIG. 2A to avoid clutter).

As illustrated in FIG. 2A, the RRC controller 210 can access the key storage 124 to access the current values of the keys $K_{RRCint}$, $K_{RRCenc}$, $K_{UPint}$ and $K_{UPenc}$. The RRC controller 210 also can communicate with the UE security controller 122 to report events in response to which the UE security controller 122 generates new keys, for example. The RRC controller 210 or the UE security controller 122 can also provide the current values of $K_{UPint}$ and/or $K_{UPenc}$ to other component(s) (e.g., a PDCP controller, an integrity protection component, integrity check component, an encryption component, a decryption component) of the UE 102 that use the current value of $K_{UPint}$ to perform integrity protection and integrity check on control-plane data and/or uses the current value $K_{UPenc}$ to encrypt and decrypt user-plane data.

Now referring to FIG. 2B, the RAN security controller 132 of FIG. 1 can operate in an example security management system 250. The security management system 250 also can include, or cooperate with, an RRC controller 260. The RAN security controller 132 and the RRC controller 260 in operation can access the key storage 134, which in this example implementation stores current values of RAN keys $K_{MN}$ and $K_{SN}$, the AMF key $K_{AMF}$, the next hop key NH, and keys $K_{RRCint}$, $K_{RRCenc}$, $K_{UPint}$, and $K_{UPenc}$ Depending on the implementation, the key $K_{MN}$ can be a $K_{gNB}$ or a $K_{eNB}$, and the key $K_{SN}$ can be a $K_{gNB}$ or $K_{eNB}$. If integrity protection is configured to the UE 102 for the user-plane data, the RAN security controller 132 may not generate the key $K_{UPint}$.

The RAN security controller 132 includes an MN security key controller 252 and an SN security key controller 254 for supporting MN-specific and SN-specific security key functions, respectively. The RAN security controller 132 at some point can apply a KDF 270 (which can include a set of functions specific to various keys) to the current value of $K_{MN}$ generate a new value of $K_{MN}$. Further, the RAN security controller 132 can use the KDF 270 to generate a value of $K_{SN}$ based at least on the current value of $K_{MN}$. In at least some of the implementations, the RAN security controller 132 also applies the current value of sk-Counter 280 when generating the value of $K_{SN}$.

In an example scenario, the MN security key controller 252 generates a value of the key $K_{MN}$, uses the value of the key $K_{MN}$ and the current value of sk-Counter 280 to generate a new value of the key $K_{SN}$, and sends the new value of the key $K_{SN}$ to the SN 106. The SN security key controller 254 then stores the current value of the $K_{SN}$ in the key storage 134.

Further, the RAN security controller 132 can use the KDF 270 to generate, using $K_{SN}$, the current values of $K_{RRCint}$ and/or $K_{RRCenc}$ for secure communication of control-plane data with the UE 102 and the current values of $K_{UPint}$ and/or $K_{UPenc}$ for secure communication of data-plane data with the UE 102. The RRC controller 260 can access the key storage 134 to access the current values of the keys $K_{RRCint}$, $K_{RRCenc}$, $K_{UPint}$, and $K_{UPenc}$ The RRC controller 260 also can communicate with the RAN security controller 132 to report events in response to which the RAN security controller 132 generates new keys, for example. If the RRC controller 260 at the SN 106 does not configure SRB3 to the UE 102, the SN security controller 254 may not generate the keys $K_{RRCint}$ and $K_{RRCenc}$. If the RRC controller 260 at the MN 104 does not configure a DRB terminated at the MN to the UE 102, the MN security controller 252 may not generate the keys $K_{UPint}$ and $K_{UPenc}$.

Still further, the RAN security controller 132 in some cases can receive, from the AMF 140, the key $K_{AMF}$ and store this key in the key storage 134. The RAN security controller 132 can use the key $K_{AMF}$ to generate a RAN key such as $K_{gNB}$, for example and/or the NH key. The RAN security controller 132 in some cases can receive, from the AMF 140, the key NH and store this key in the key storage 134. The RAN security controller 132 can use the key NH to generate a RAN key such as $K_{gNB}$, for example.

As indicated above, the wireless communication network 100 can generate security keys according to a certain hierarchy, so that a value of a security key associated with a particular radio bearer can depend on the RAN key of a base station at which the radio bearer terminates, which in turn can depend on the previous value of the RAN key and/or a key associated with a CN entity such as the AMF 140.

For further clarity, FIG. 3 illustrates a fragment 300 of a security key hierarchy that includes the keys $K_{AMF}$, $K_{gNB}$, NH, $K_{RRCint}$, $K_{RRCenc}$, $K_{UPint}$, and $K_{UPenc}$. The key $K_{AMF}$, which can have a certain dependency on one or more parameters of the corresponding CN, can serve (at least partially) as a parent to RAN keys such as the $K_{gNB}$, as well as the NH key. The $K_{gNB}$ or the NH key can serve as the basis for generating a new version of the key $K_{gNB}$, i.e., $K_{gNB}'$ (e.g., $K_{gNB} \rightarrow K_{gNB}'$ or NH$\rightarrow K_{gNB}'$). The key $K_{gNB}$ is used to generate the keys $K_{RRCint}$, $K_{RRCenc}$, $K_{UPint}$, and $K_{UPenc}$. If the key $K_{gNB}'$ is generated, the key $K_{gNB}'$ is used to generate new versions of the keys $K_{RRCint}$, $K_{RRCenc}$, $K_{UPint}$, and $K_{UPenc}$.

Figure 4:
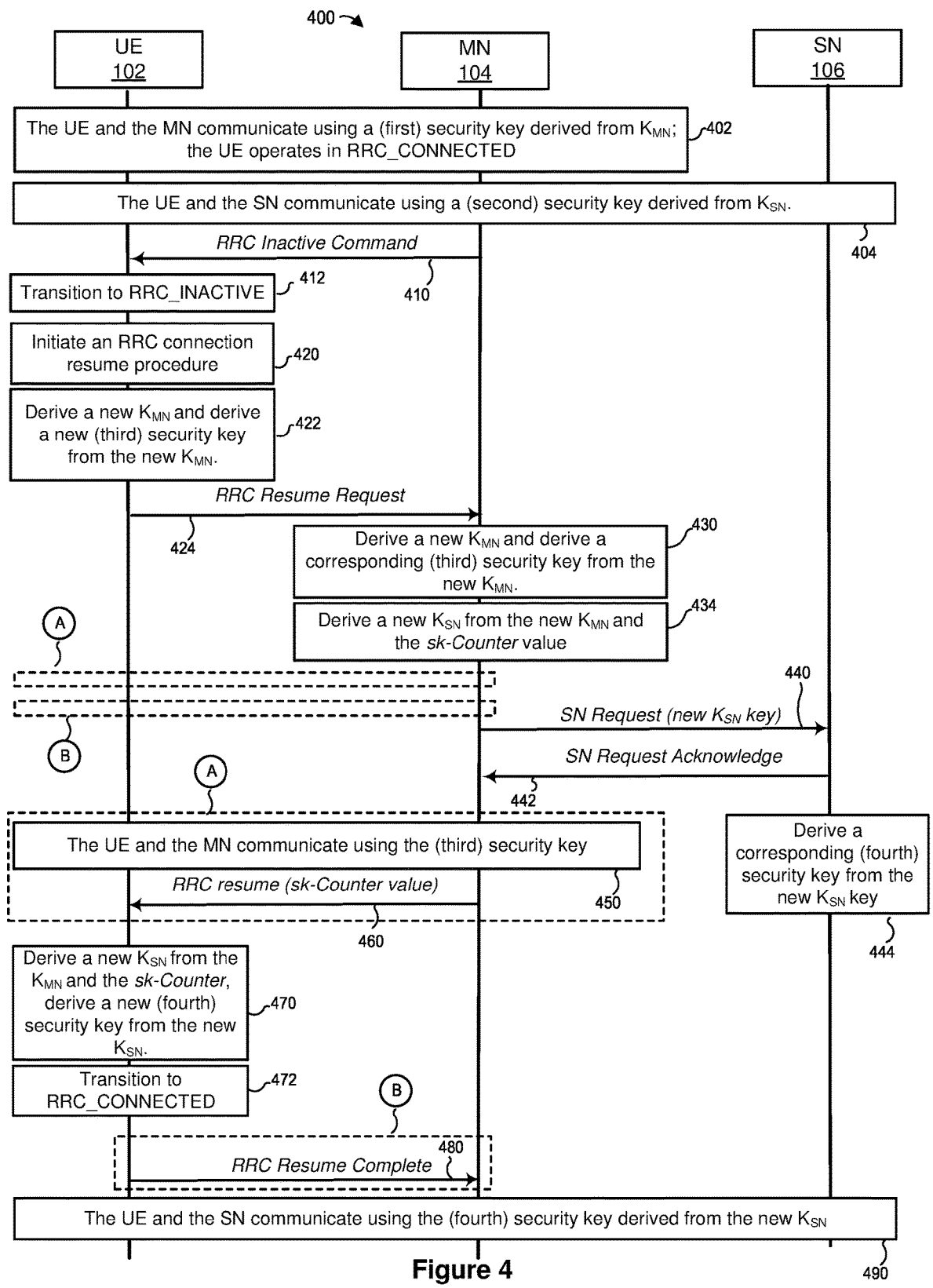
FIG. 4 is a messaging diagram of an example scenario in which the MN transmits a new $K_{SN}$ key to the SN and an instruction to the UE to resume the suspended radio connection.

FIG. 4 depicts a messaging diagram of an example scenario 400 in which the UE 102 and the SN 106 derive the same security key from the $K_{SN}$ upon the UE 102 resuming a suspended radio connection. At the beginning of the scenario 400, the UE 102 is in a connected state associated with a protocol for controlling radio resources (e.g., the RRC_CONNECTED state associated with the RRC protocol).

The UE 102 and the MN 104 communicate 402 using a (first) security key derived from the $K_{MN}$ and, in some cases, one or more additional keys. For example, the UE 102 and the MN 104 can derive the first security key $K_{RRCint}$, $K_{RRCenc}$, $K_{UPint}$, and $K_{UPenc}$ using at least the $K_{MN}$ key and at least one algorithm derivation function with one or more parameters. Referring back to FIGS. 2A and 2B, the UE 102 and MN 104 can utilize the KDF 220 and the KDF 270, respectively, to derive the first security key based at least in part on the $K_{MN}$.

When the MN 104 is an Mng-NB, the $K_{MN}$ key can be a $K_{gNB}$ key used as a $K_{eNB}$ key. When the MN 104 is an MgNB, the $K_{MN}$ key ca be a $K_{gNB}$ key. When the SN 106 is an SgNB, the $K_{SN}$ key can be an S-$K_{gNB}$ key. When the SN 106 is an Sng-eNB, the $K_{SN}$ key can be a $K_{gNB}$ key used as an S-$K_{eNB}$ key.

The UE 102 and MN 104 can generate a first $K_{RRCint}$ key to protect the integrity of RRC PDUs and/or a first $K_{RRCenc}$ key to encrypt RRC PDUs, on the control plane. More specifically, the UE 102 can generate an uplink RRC PDU, perform integrity protection for the uplink RRC PDU using the first $K_{RRCint}$ key to generate an integrity-protected RRC PDU (e.g., including the uplink RRC PDU and a message authentication code for integrity (MAC-I) generated from the uplink RRC PDU and the first $K_{RRCint}$ key), encrypt the integrity-protected RRC PDU using the first $K_{RRCenc}$ key, and send the encrypted and integrity-protected RRC PDU to the MN 104, over a corresponding SRB as discussed below. The MN 104 then can receive this encrypted and integrity-protected RRC PDU, decrypt the encrypted and integrity-protected RRC PDU using the first $K_{RRCenc}$ key to generate a decrypted integrity-protected RRC PDU, and finally perform the integrity check on the decrypted integrity-protected RRC PDU using the first $K_{RRCint}$ key to obtain the original uplink RRC PDU (e.g. using the first $K_{RRCint}$ key to verify the MAC-I). The MN 104 in a similar manner can generate a downlink RRC PDU, apply integrity protection and encryption to the downlink RRC PDU using the first $K_{RRCint}$ key and first $K_{RRCenc}$ key, respectively, and the UE 102 can decrypt and perform integrity protection using the first $K_{RRCint}$ key and the first $K_{RRCenc}$ key to obtain the original downlink RRC PDU.

The RRC PDUs can include for example RRC messages that conform to 3GPP TS 38.331 when the MN 104 is an MgNB, or RRC messages that conform to 3GPP TS 36.331 when the MN 104 is an Mng-eNB. The UE 102 and the MN 104 can exchange the RRC PDUs over an SRB (e.g., an SRB1 or an SRB2). To configure the SRB, the MN 104 can use a connection establishment procedure, an RRC connection setup procedure, an RRC connection reconfiguration procedure, or an RRC reconfiguration procedure, for example.

To communicate on the user plane, the UE 102 and the MN 104 can use an MN-terminated DRB which can be an MCG radio bearer or a split radio bearer to exchange UP data packets (e.g., IP packets, Ethernet packets, Service Data Adaptation Protocol (SDAP) PDUs). When the MN 104 configures integrity protection for the MN-terminated DRB, the UE 102 and the MN 104 can generate a first $K_{UPint}$ key to protect the integrity of a downlink data packet and/or a first $K_{UPenc}$ key to encrypt the downlink data packet. More specifically, the MN 104 can generate a downlink data packet, perform integrity protection for the downlink data packet using the first $K_{UPint}$ key to generate an integrity-protected data packet (e.g., including the data packet and a MAC-I generated from the data packet and the first $K_{UPint}$ key), encrypt the integrity-protected data packet using the first $K_{UPenc}$ key, and send the encrypted and integrity-protected data packet to the UE 102, over a corresponding DRB. The UE 102 can receive this encrypted and integrity-protected data packet, decrypt the encrypted and integrity-protected data packet using the first $K_{UPenc}$ key to generate a decrypted integrity-protected data packet, and finally performs the integrity check on the decrypted integrity-protected data packet using the first $K_{UPint}$ key to obtain the original downlink data packet. The UE 102 in a similar manner can generate an uplink data packet, apply integrity protection and encryption to the uplink data packet using the first $K_{UPint}$ key and first $K_{UPenc}$ key, respectively, and the MN 104 can decrypt and perform integrity protection using the first $K_{UPint}$ key and first $K_{UPenc}$ key to obtain the original uplink data packet (e.g. using the first $K_{UPint}$ key to verify the MAC-I).

In some cases, the MN 104 does not configure integrity protection for the MN-terminated DRB, and the UE 102 and the MN 104 need not derive the first $K_{UPint}$ key. The MN 104 in this case does not perform integrity protection on downlink data packets the MN 104 sends to the UE 102, nor does the MN 104 perform integrity protection on uplink data packets the MN 104 receives from the UE 102. In other cases, the MN 104 does not configure the MN-terminated DRB, and the UE 102 and the MN 104 need not derive the first $K_{UPint}$ key and the first $K_{UPenc}$ key.

For simplicity, the discussion of FIG. 4 refers to the first, second, third, and fourth security keys in singular (e.g., "the first security key"). However, for the reasons explained above, the UE 102, the MN 104, or the SN 106 can use one or more security keys in each of the first, second, third, and fourth instances to exchange control-plane data or user-plane data. The UE 102 can use one or more of the first $K_{RRCint}$, the first $K_{RRCenc}$, the first $K_{UPint}$, or the first $K_{UPenc}$ to communicate 402 with the MN 104 in the first instance; one or more of the second $K_{RRCint}$, the second $K_{RRCenc}$, the second $K_{UPint}$, or the second $K_{UPenc}$ to communicate 404 with the SN 106 in the second instance; one or more of the third $K_{RRCint}$, the third $K_{RRCenc}$, the third $K_{UPint}$, or the third $K_{UPenc}$ to communicate 450 with the MN 104 in the third instance; and one or more of the fourth $K_{RRCint}$, the fourth $K_{RRCenc}$, the fourth $K_{UPint}$, or the fourth $K_{UPenc}$ to communicate 490 with the SN 106 in the fourth instance. Thus, in the discussion below, the "Nth security key" should be understood to refer to one or more security keys.

With continued reference to FIG. 4, the UE 102 and the SN 106 communicate 404 using a (second) security key derived from the $K_{SN}$ and, in some cases, one or more additional keys. The UE 102 and the SN 106 can derive the second security key $K_{RRCint}$, $K_{RRCenc}$, $K_{UPint}$, and $K_{UPenc}$ using at least the $K_{MN}$ key and at least one algorithm derivation function with one or more parameters. Referring back to FIGS. 2A and 2B, the UE 102 and SN 106 can utilize the KDF 220 and the KDF 270, respectively, to derive the first security key based at least in part on the $K_{SN}$.

Similar to event 402, the UE 102 and SN 106 can generate a second $K_{RRCint}$ key to protect the integrity of RRC PDUs and/or a second $K_{RRCenc}$ key to encrypt RRC PDUs. The UE 102 can generate an uplink RRC PDU, perform integrity protection for the uplink RRC PDU using the second $K_{RRCint}$ key to generate an integrity-protected RRC PDU (e.g., including the RRC PDU and a MAC-I generated from the RRC PDU and the second $K_{RRCint}$ key), encrypt the integrity-protected RRC PDU using the second $K_{RRCenc}$ key, and send the encrypted and integrity-protected RRC PDU to the SN 106, over a corresponding SRB which can be an SRB3. The SN 106 then can receive this encrypted and integrity-protected RRC PDU, decrypt the encrypted and integrity-protected RRC PDU using the second $K_{RRCenc}$ key to generate a decrypted integrity-protected RRC PDU, and finally perform the integrity check on the decrypted integrity-protected RRC PDU using the second $K_{RRCint}$ key to obtain the original uplink RRC PDU (e.g. using the second $K_{RRCint}$ key to verify the MAC-I). The SN 106 in a similar manner can generate a downlink RRC PDU, apply integrity protection and encryption to the downlink RRC PDU using the second $K_{RRCint}$ key and second $K_{RRCenc}$ key, respectively, and the UE 102 can decrypt and perform integrity protection using the second $K_{RRCint}$ key and second $K_{RRCenc}$ key to obtain the original downlink RRC PDU.

Similar to the RRC PDUs the UE 102 exchanges with the MN 104, the RRC PDUs travelling on an SRB terminated at the SN 106 can include RRC messages that conform to 3GPP TS 38.331 when the SN 104 is an SgNB. As indicated above, the UE 102 and the SN 106 can exchange the RRC PDUs over an SRB3 for example. To configure the SRB3, the SN 106 can use an RRC connection reconfiguration procedure or an RRC reconfiguration procedure, for example. Depending on implementation of the SN 106, the SN 106 may not configure the SRB3 to the UE 102. If the SN 106 does not configure SRB3 to the UE 102, the UE 102 and SN 106 may not generate the second $K_{RRCint}$ key and/or the second $K_{RRCenc}$ key.

Further, the UE 102 and the SN 106 can use an SN-terminated DRB which can be an SCG radio bearer or a split radio bearer to exchange UP data packets (e.g., IP packets or Ethernet packets). When the SN 106 configures integrity protection for the SN-terminated DRB, the UE 102 and the SN 106 can generate a second $K_{UPint}$ key to protect the integrity of a downlink data packet and/or a second $K_{UPenc}$ key to encrypt the downlink data packet. More specifically, the SN 106 can generate a downlink data packet, perform integrity protection for the downlink data packet using the second $K_{UPint}$ key to generate an integrity-protected data packet (e.g., including the data packet and a MAC-I generated from the data packet and the second $K_{UPint}$ key), encrypt the integrity-protected data packet using the second $K_{UPenc}$ key, and send the encrypted and integrity-protected data packet to the UE 102, over a corresponding DRB. The UE 102 can receive this encrypted and integrity-protected data packet, decrypt the encrypted and integrity-protected data packet using the second $K_{UPenc}$ key to generate a decrypted integrity-protected data packet, and finally performs the integrity check on the decrypted integrity-protected data packet using the second $K_{UPint}$ key to obtain the original downlink data packet (e.g. using the second $K_{UPint}$ key to verify the MAC-I). The UE 102 in a similar manner can generate an uplink data packet, apply integrity protection and encryption to the uplink data packet using the second $K_{UPint}$ key and the second $K_{UPenc}$ key, respectively, and the SN 106 can decrypt and perform integrity protection using the second $K_{UPint}$ key and the second $K_{UPenc}$ key to obtain the original uplink data packet.

In some cases, the SN 106 does not configure integrity protection for the SN-terminated DRB, and the UE 102 and the SN 106 need not derive the second $K_{UPint}$ key. The SN 106 in this case does not perform integrity protection on downlink data packets the SN 106 sends to the UE 102, nor does the SN 106 perform integrity protection on uplink data packets the SN 106 receives from the UE 102.

Thus, while operating in the RRC_CONNECTED state, the UE 102 can communicate 402, 404 in dual connectivity with the MN 104 and the SN 106. Alternatively, the UE 102 can operate in single connectivity with the MN 104 and communicate with the SN 106 via the MN 104.

At some point, the MN 104 can transmit 410 an RRC inactive command to the UE 102. In response to the RRC inactive command, the UE 102 can transition 412 to a connected state associated with a protocol for controlling radio resources (e.g., the RRC_INACTIVE state associated with the RRC protocol). When the MN 104 is an MgNB, the RRC inactive command message can be an RRC release (RRCRelease) message. When the MN 104 is an Mng-eNB, the RRC inactive command can be an RRC connection release (RRCConnectionRelease) message.

After a period of inactivity on the radio interface with the RAN 108, the UE 102 initiates 420 an RRC connection resume procedure to resume RCC connection. In some scenarios, the UE 102 initiates 420 the RRC connection resume procedure to transmit uplink data if, for example, a higher layer of the communication requests a connection. In another scenario, the UE 102 initiates 420 the RRC connection resume procedure to respond to a page from the MN 104.

In response to the UE 102 initiating 420 the RRC connection procedure, for example, the UE 102 can derive 422 a new $K_{MN}$ and a new (third) security key based, at least in part, on the new $K_{MN}$. The UE 102 can derive the new value of $K_{MN}$ based on the previous value of $K_{MN}$ or, in some cases, using the NH key the UE 102 obtains from the MN 104. The UE 102 in this case derives more than one new security key (e.g., $K_{RRCint}$, $K_{RRCenc}$, $K_{UPint}$, or $K_{UPenc}$) from the new $K_{MN}$. The MN 104 indicates that the UE 102 should use the previous value of $K_{MN}$ or the NH key in the RRC inactive command. In some implementations, the MN 104 includes a Next Hop Chaining Count value in the RRC inactive command. If the Next Hop Chaining Count value is associated with the NH key, the UE 102 and the MN 104 derive the new value of $K_{MN}$ based on the NH key. If the Next Hop Chaining Count value is associated with the previous value of $K_{MN}$, the UE 102 and the MN 104 derive the new value of $K_{MN}$ based on the previous value of $K_{MN}$. The UE 102 in some cases can derive more than one new $K_{MN}$ (e.g., for each of several radio bearers) and derive more than one new security key (e.g., $K_{RRCint}$, $K_{RRCenc}$, $K_{UPint}$, or $K_{UPenc}$) from each new $K_{MN}$.

The UE 102 can derive 422 the new $K_{MN}$ and the third security key before the UE 102 transmits 424 an RRC resume request or after the UE 102 transmits 424 the RRC resume request, depending on the implementation. Further, the UE 102 can derive 422 the new $K_{MN}$ and the third security key before the UE 102 receives 460 an RRC resume message (see below). Still further, in some implementations the UE 102 derives 422 the new $K_{MN}$ and the third security key in response to receiving 410 the RRC inactive command.

In response to receiving 424 the RRC resume request, or in response to transmitting 410 the RRC inactive command, the MN 104 can generate a new $K_{MN}$ key and derive at least one third security key ($K_{RRCint}$, $K_{RRCenc}$, $K_{UPint}$, and $K_{UPenc}$) based at least in part on the new $K_{MN}$ key. In some implementations, the MN 104 derives the new $K_{MN}$ key from the previous value of $K_{MN}$. In other implementations, the MN 104 derives the new $K_{MN}$ key from the NH key or from the $K_{AMF}$ key (see FIG. 2B). The MN 104 then can apply the KDF 270 and one or more parameters to the new $K_{MN}$ key to generate the third security key.

The MN 104 can exchange data with the UE 102 using this new, third security key. Similar to event 402 discussed above, the data can include control-plane (e.g., RRC PDUs)

and/or user-plane data units (e.g., IP packets, Ethernet Packets, SDAP PDUs). As a more specific example, the first RRC PDU the MN 104 transmits to the UE 102 using the third security key can include the RRC resume message (see event 460), and the first RRC PDU the UE 102 transmits to the MN 104 using the third security key can include the RRC resume complete message (see event 480). The UE 102 and the MN 104 can correctly process these RRC PDUs using the third security key.

Thus, because the UE 102 and the MN 104 generate the third key using the new $K_{MN}$ key, the third security key is aligned (e.g., identical or having another type of correspondence or dependency) between the UE 102 and the MN 104, and thus the UE 102 and the MN 104 can correctly encrypt data and/or apply integrity protection.

The MN 104 can generate 434 a new $K_{SN}$ key using the new $K_{MN}$ key and the sk-Counter value, according to some implementations. The MN 104 can maintain the sk-Counter value for the UE 102. In other implementations, the MN 104 receives the sk-Counter value from the CN 110. In yet other implementations, the MN 104 can determine or update the sk-Counter under certain conditions. In particular, the MN 104 can increment the sk-Counter value by N, where N is a positive integer such as 1, 2, etc.

The MN 104 includes the new $K_{SN}$ key in the SN Request message and sends 440 the SN Request message to the SN 106. In some cases, the MN 104 includes the updated sk-Counter in the same or different, subsequent SN Request message to the SN 106.

The SN 106 then can derive 444 at least one new, fourth security key from the new $K_{SN}$ key. The SN 106 sends 442 an SN Request Acknowledge message in response to the SN Request message. In some implementations the SN 106 derives the fourth security key from the new $K_{SN}$ key before transmitting 442 the SN Request Acknowledge message. In other implementations, the SN 106 derives the fourth security key from the new $K_{SN}$ key after transmitting 442 the SN Request Acknowledge message.

In some implementations, the SN Request message is an S-Node Modification Request message, and the SN Request Acknowledge message is an S-Node Modification Request Acknowledge message. In other implementations, the SN Request message is an S-Node Addition Request message, and the SN Request Acknowledge message is an S-Node Addition Request Acknowledge message.

With continued reference to FIG. 4, after the UE derives 422 the new $K_{MN}$ and the third security key, the UE 102 and the MN 104 can communicate 450 using the third security key. Similar to event 402 discussed above, the data that the UE 102 and the MN 104 exchange can include be CP or UP data. The UE 102 and the MN 104 can apply encryption and/or integrity protection techniques using the new third security key, and in some cases one or more additional security keys, as discussed above with reference to event 402.

In response to receiving 424 the RRC resume request, or in response to receiving 442 the SN Request Acknowledge message, the MN 104 can transmit 460 to the UE 102 the RRC resume message. The RRC resume message can include the value of the sk-Counter discussed above. The UE 102 can use the third security key to receive 460 a downlink RRC PDU including the RRC resume message. The UE 102 in response can transmit 480 to the MN 104 an RRC resume complete message. The UE 102 can use third security key to transmit 480 an uplink RRC PDU including the RRC resume complete message. The UE 102 then can enter transition 472 back to the connected state (e.g., RRC_CONNECTED).

When the MN 104 is an MgNB, the RRC resume request can be an RRC Resume Request (RRCResumeRequest) message, the RRC resume message can be an RRC Resume (RRCResume) message, and the RRC resume complete message can be an RRC Resume Complete (RRCResumeComplete) message. When the MN 104 is an Mng-eNB, the RRC resume request message can be an RRC Connection Resume Request (RRCConnectionResumeRequest) message, the RRC resume message can be an RRC Connection Resume (RRCConnectionResume) message, and the RRC resume complete message can be an RRC Connection Resume Complete (RRCConnectionResumeComplete) message.

Prior to transitioning 472 to the connected state, or after transitioning to the connected state, the UE 102 can derive 470 a new $K_{SN}$ from the new $K_{MN}$ and the sk-Counter. The UE 102 then can derive a new, fourth security key from the new $K_{SN}$. Thus, the SN 106 and the UE 102 can derive 444,470 the fourth security key that are properly aligned, so that the SN 106 and the UE 102 can properly encrypt, decrypt, and/or apply integrity protection to uplink and downlink traffic (data and/or control messages).

As illustrated in FIG. 4, the UE 102 and the SN 106 can communicate 490 using the fourth security key. Similar to event 404 discussed above, the traffic in event 490 can include control-plane (e.g., RRC PDUs) and/or user-plane data units (e.g., IP packets, Ethernet Packets, SDAP PDUs). The UE 102 and the SN 106 can apply the one or more fourth security keys $K_{RRCint}$, $K_{RRCenc}$, $K_{UPint}$, and $K_{UPenc}$ as discussed above with reference to event 404.

The UE 102 and the SN 106 can use an SN-terminated SRB or a DRB which can be an SCG radio bearer or a split radio bearer. In some scenarios, the UE 102 and the SN 106 communicate 490 with each other via the MN 104. More specifically, the SN 106 may not configure radio resources to the UE 102, so that the UE 102 uses radio resources of the MN 104 (the lower layers of a radio bearer) to communicate with the SN 106 via the MN 104. In other scenarios, if the SN 106 is a SgNB, the SN 106 configures radio resources for the UE 102 in a cell group configuration (a CellGroupConfig information element (IE)) and sends the CellGroupConfig IE to the MN 104 in the SN Request Acknowledge message. The MN 104 then includes the CellGroupConfig IE in the RRC resume message (event 460). The UE 102 and the SN 106 can use the fourth security key to communicate data with each other using the CellGroupConfig IE. In some implementations, the SN 106 includes the CellGroupConfig IE in a RRCReconfiguration message and includes the RRCReconfiguration message in the SN Request Acknowledge message (event 442). The MN includes the RRCReconfiguration message in the RRC resume message (event 460).

The MN 104 in some cases indicates that the UE 102 should re-establish PDCP for an SRB (e.g., SRB2). To this end, the MN 104 use an IE or field (e.g., reestablishPDCP) in the RRC resume message (event 460). The MN 104 in some cases also can use this IE or field, or a similar IE or field, to indicate that the UE 102 should re-establish PDCP for an MN-terminated DRB or an SN-terminated DRB. The SN 106 also can indicate that the UE 102 should re-establish PDCP for an SRB (e.g., SRB3) in an IE or field (e.g., reestablishPDCP) and send 442 the IE or field to the MN 104 in the SN Request Acknowledge message. The SN 106 also can indicate that the UE 102 should to re-establish PDCP for an SN-terminated DRB in an IE or field (e.g., reestablishPDCP) and send 442 the IE or field to the MN 104 in the SN Request Acknowledge message. The MN then can include the one or more IEs with this indication in the RRC resume message (event 460).

In some cases, the MN 104 can receive from the UE 102 control-plane or user-plane traffic addressed to the SN 106 after transmitting 480 the RRC resume message but before transmitting 440 the SN Request message or receiving 442 the SN Request Acknowledge message. In this case, the MN 104 can buffer the SN-bound traffic. The MN 104 then can send the buffered traffic to the SN 106 after transmitting 440 the SN Request message or receiving 442 the SN Request Acknowledge message.

As illustrated in FIG. 4, the MN 106 in some implementations or scenarios can transmit an instruction to the UE 102 to resume the suspended radio connection prior to transmitting 440 the new $K_{SN}$ key to the SN 106 (procedure "A"). Further, the MN 106 in some implementations or scenarios can transmit an instruction to the UE 102 to resume the suspended radio connection and also receive an indication that the UE 102 has resumed the suspended radio connection (procedure "B") prior to transmitting 440 the new $K_{SN}$ key to the SN 106.

Figure 5:
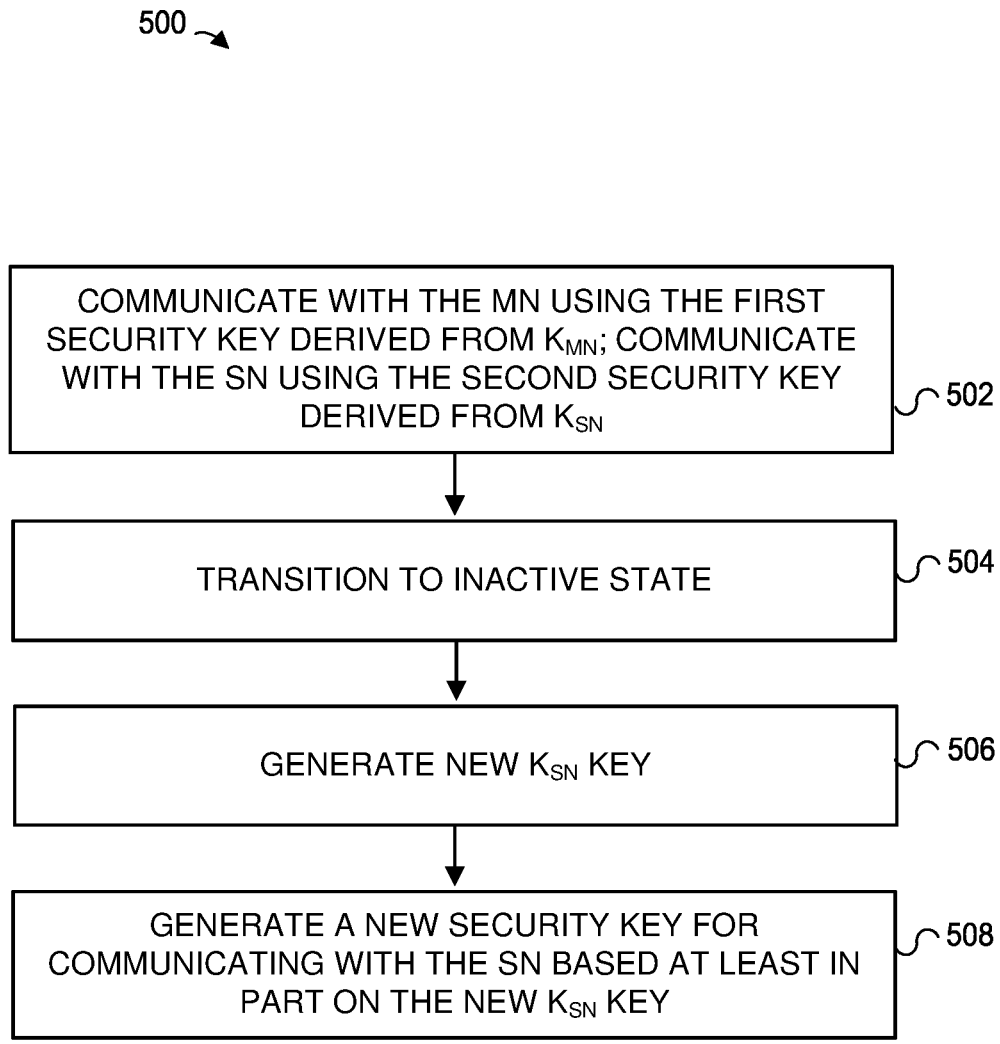
FIG. 5 is a flow diagram of an example method for generating a security key for communicating with the SN, which can be implemented in the UE of FIG. 1.

Referring to FIG. 5, an example method 500 for generating a security key for communicating with an SN can be implemented in a suitable UE. For convenience, the method 500 is discussed below with reference to the UE 102 operating in the wireless communication system 100.

The method 500 begins at block 502, where the UE 102 communicates with the MN 104 and the SN 106 using at least one first security key and at least one second security key, respectively. The first security key(s) can be one or more of first $K_{RRCint}$, $K_{RRCenc}$, $K_{UPint}$, and $K_{UPenc}$ which the UE 102 and the MN 104 generate based on the $K_{MN}$. The second security key(s) can be one or more of second $K_{RRCint}$, $K_{RRCenc}$, $K_{UPint}$, and $K_{UPenc}$ which the UE 102 and the MN 104 generate based on the $K_{SN}$. The UE 102 can communicate at block 502 as discussed above with reference to events 402 and 404 of FIG. 4, for example.

At block 504, the UE 102 transitions from a connected state (e.g., RRC_ACTIVE) to an inactive state (e.g., RRC_INACTIVE) at block 504. The UE 102 can make this transition in response to a command from the MN 104, for example (see event 410 of FIG. 4).

Next, at block 506, the UE 102 can generate a new $K_{SN}$ key (see event 470 of FIG. 4). The UE 102 can generate this key in response to detecting that the UE 102 should transition back to the connected state, for example. To generate the new $K_{SN}$ key, the UE 102 in some implementations first generates a new $K_{MN}$ key (see event 422 of FIG. 4), receives an sk-Counter value from the MN 104 (see event 460 of FIG. 4), and derives the new $K_{SN}$ key based at least in part on the new $K_{MN}$ key and the sk-Counter (see event 470).

At block 508, the UE 102 can generate at least one new security key for communicating with the SN 106. According to the scenario 400 discussed above, the at least one new security key for communicating with the SN 106 is one or more of the fourth security keys $K_{RRCint}$, $K_{RRCenc}$, $K_{UPint}$, and $K_{UPenc}$, which the UE 102 can generate using the new $K_{SN}$ key.

Figure 6:
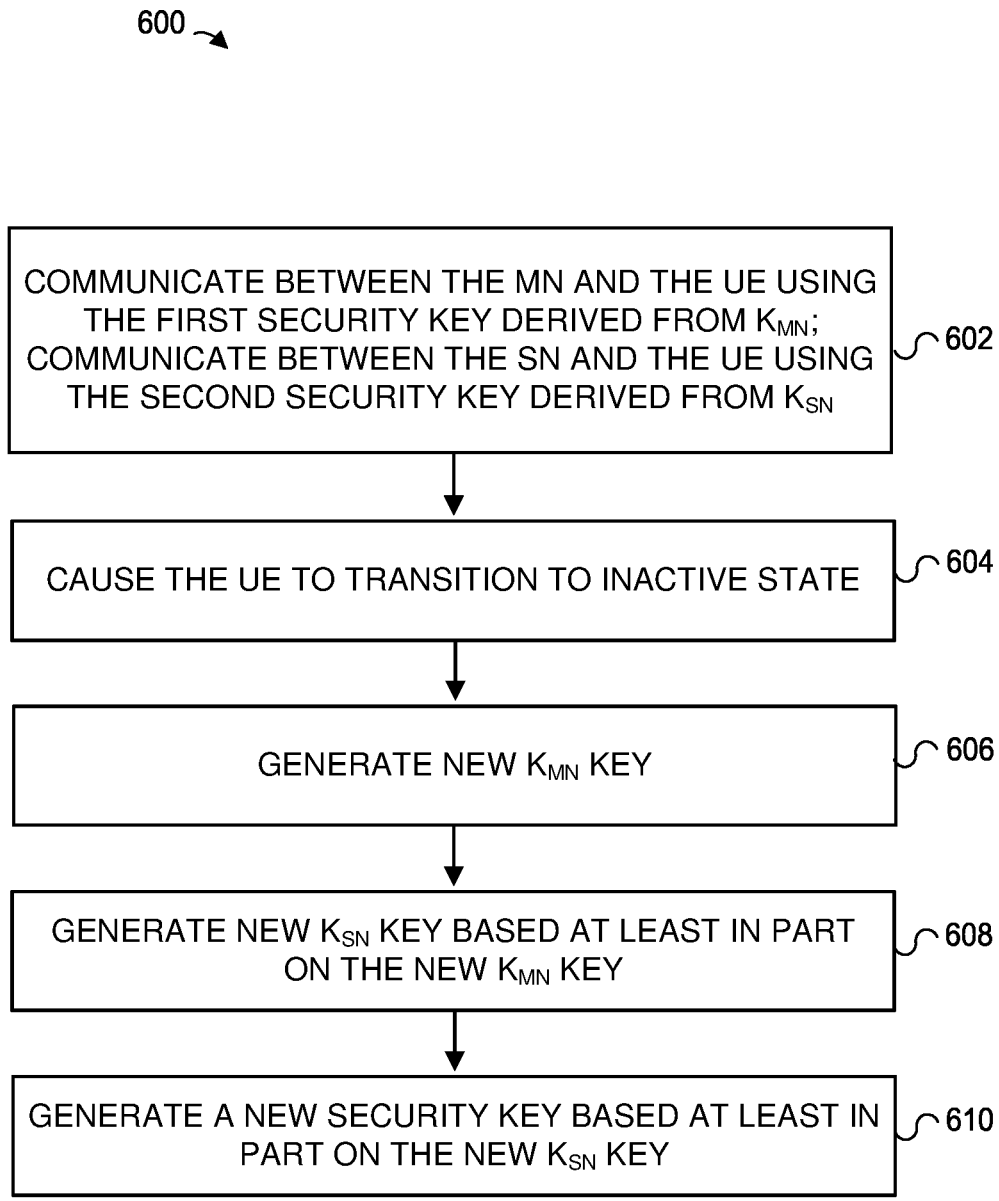
FIG. 6 is a flow diagram of an example method for generating a security key for communicating between the SN and the UE, which can be implemented in the RAN of FIG. 1.

Next, FIG. 6 illustrated an example method 600 for generating a security key for communicating between the SN and the UE, which can be implemented in a RAN including base stations than can support dual connectivity for a UE. For convenience, the method 600 is discussed below with reference to the RAN 108 of the wireless communication system 100.

At block 602, the MN 104 and the SN 106 communicate with the UE 102 using at least one first security key and at least one second security key, respectively. The first security key(s) can be one or more of first $K_{RRCint}$, $K_{RRCenc}$, $K_{UPint}$, and $K_{UPenc}$ which the UE 102 and the MN 104 generate based on the $K_{MN}$. The second security key(s) can be one or more of second $K_{RRCint}$, $K_{RRCenc}$, $K_{UPint}$, and $K_{UPenc}$ which the UE 102 and the MN 104 generate based on the $K_{SN}$. The RAN 108 can communicate with the UE 102 at block 602 as discussed above with reference to events 402 and 404 of FIG. 4, for example.

At block 604, the RAN 108 causes the UE 102 to transition from a connected state (e.g., RRC_ACTIVE) to an inactive state (e.g., RRC_INACTIVE). To this end, the MN 104 can transmit a command to the UE 102 for example (see event 410 of FIG. 4). Next, at block 606, the RAN 108 generates a new key $K_{MN}$ (see event 430 of FIG. 4). The RAN 108 then uses the new key $K_{MN}$ to generate a new key $K_{SN}$ (see event 434 of FIG. 4). As discussed above, the MN 104 can generate the new key $K_{SN}$ and transmit (see event 440) the new key $K_{SN}$ to SN 106.

At block 610, the RAN 108 can generate at least one new security key for communicating between the SN 106 and the UE 102 (see event 444), using the new key $K_{SN}$. According to the scenario 400 discussed above, the at least one new security key for communicating between the SN 106 and the UE 102 is one or more of the fourth security keys $K_{RRCint}$, $K_{RRCenc}$, $K_{UPint}$, and $K_{UPenc}$.

The following additional considerations apply to the foregoing discussion.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC), a digital signal processor (DSP), etc.) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate still additional and alternative structural and functional designs for managing security keys through the principles disclosed herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

When implemented in software, the techniques can be provided as part of the operating system, a library used by multiple applications, a particular software application, etc. The software can be executed by one or more general-purpose processors or one or more special-purpose processors.

Aspect 1. A security key management method in a user equipment (UE) capable of concurrent communication with a master node (MN) and a secondary node (SN), the method comprising: transitioning, by processing hardware, from a connected state in which the UE communicates with the MN using a first security key and with the SN using a second security key, to an inactive state in which a radio connection between the UE and a radio access network (RAN) is suspended; and performing, by the processing hardware, a procedure for transitioning from the inactive state to the connected state, including: generating a new RAN key $K_{SN}$ corresponding to the SN, and generating a new security key for communicating with the SN based on at least the new RAN key $K_{SN}$.

Aspect 2. The method of aspect 1, wherein performing the procedure for transitioning from the inactive state to the connected state further includes: generating a new RAN key $K_{MN}$ corresponding to the MN, wherein generating the new RAN key $K_{SN}$ is based on at least the new RAN key $K_{MN}$.

Aspect 3. The method of aspect 2, wherein generating the new RAN key $K_{SN}$ is based further on a counter value sk-Counter associated with an initial configuration of security for a radio bearer terminated at the SN.

Aspect 4. The method of aspect 3, further comprising: receiving the counter value sk-Counter from the MN, in response to a request from the UE to resume the radio connection.

Aspect 5. The method of aspect 2, wherein the new security key is a fourth security key, the method further comprising: generating a third security key for communicating with the MN based at least on the new RAN key $K_{MN}$.

Aspect 6. The method of aspect 5, wherein generating the third security key is in response to detecting at least one of: (i) an initiation of a procedure for resuming the radio connection between the UE and the RAN, or (ii) a notification from the MN that the radio connection is inactive.

Aspect 7. The method of aspect aim 5, further comprising: receiving, from the MN, a data unit including an instruction to resume the suspended radio connection, using the third security key.

Aspect 8. The method of any of aspects 1-7, wherein generating the new security key for communicating with the MN or the SN includes generating an integrity protection key $K_{RRCint}$ for use with radio resource control (RRC) data transmitted over a signaling radio bearer (SRB).

Aspect 9. The method of any of aspects 1-7, wherein generating the new security key for communicating with the MN or the SN includes generating an encryption key $K_{RRCenc}$ for use with RRC data transmitted over an SRB.

Aspect 10. The method of any of aspects 1-7, wherein generating the new security key for communicating with the MN or the SN includes generating an encryption key $K_{UPenc}$ for use with user-plane data transmitted over a data radio bearer (DRB).

Aspect 11. A user equipment (UE) comprising processing hardware and configured to implement a method according to any of aspects 1-10.

Aspect 12. A security key management method in a radio access network (RAN) that includes a first base station operating as a master node (MN) and a second base station operating as a secondary node (SN), the method comprising: causing, by processing hardware, a UE to transition from a connected state in which the UE communicates with the MN using a first security key and with the SN using a second security key, to an inactive state in which a radio connection between the UE and the RAN is suspended; subsequently to causing the UE to transition to the inactive state, generating, by the processing hardware, a new RAN key $K_{MN}$ corresponding to the MN; generating, by the processing hardware, a new RAN key $K_{SN}$ corresponding to the SN, based on at least the new RAN key $K_{MN}$; and generating, by the processing hardware, a new security key for communicating between the UE and the SN, based on at least the new RAN key $K_{SN}$.

Aspect 13. The method of aspect 12, wherein generating the new RAN key $K_{MN}$ is in response to receiving, from the UE, a request to resume the suspended radio connection.

Aspect 14. The method of aspect 12, wherein: causing the UE to transition to the inactive state includes transmitting a notification to the UE that the radio connection is inactive; and generating the new RAN key $K_{MN}$ is in response to transmitting the notification.

Aspect 15. The method of any of aspects 12-14, wherein generating the new RAN key $K_{MN}$ includes deriving the new RAN key $K_{MN}$ from a previous RAN key $K_{MN}$.

Aspect 16. The method of any of aspects 12-14, wherein generating the new RAN key $K_{MN}$ includes deriving the new RAN key $K_{MN}$ from a next hop (NH) key associated with a core network (CN).

Aspect 17. The method of any of aspects 12-14, wherein generating the new RAN key $K_{MN}$ includes deriving the new RAN key $K_{MN}$ from an Authentication Management Function (AMF) key $K_{AMF}$ associated with an AMF of a serving network.

Aspect 18. The method of aspects 12-17, wherein generating the new RAN key $K_{SN}$ is based further on a counter value sk-Counter associated with an initial configuration of security for a radio bearer terminated at the SN.

Aspect 19. The method of aspect 18, further comprising transmitting the counter value sk-Counter to the UE in response to a request to resume the suspended radio connection.

Aspect 20. The method of aspect 18, further comprising receiving the counter value sk-Counter from a core network (CN).

Aspect 21. The method of aspect 18, further comprising maintaining the counter value sk-Counter at the MN.

Aspect 22. The method of any of aspects 12-21, further comprising: transmitting, from the MN to the SN, the new RAN key $K_{SN}$, and subsequently to transmitting the new RAN key $K_{SN}$ to the SN, transmitting, from the MN to the UE, an instruction to resume the suspended radio connection.

Aspect 23. The method of any of aspects 12-21, further comprising: transmitting, from the MN to the UE, an instruction to resume the suspended radio connection; and subsequently to transmitting the instruction to resume the suspended radio connection, transmitting, from the MN to the SN, the new RAN key $K_{SN}$.

Aspect 24. The method of any of aspects 12-21, further comprising: transmitting, from the MN to the UE, an instruction to resume the suspended radio connection; receiving, at the MN from the UE, an indication that the radio connection is resumed; and in response to receiving the indication that the radio connection is resumed, transmitting, from the MN to the SN, the new RAN key $K_{SN}$.

Aspect 25. The method of any of aspects 12-24, wherein the new security key is a fourth key, the method further comprising: generating a third security key for communicating between the UE and the MN, based on at least the new RAN key $K_{MN}$.

Aspect 26. The method of any of aspects 12-25, further comprising: transmitting, from the MN to the UE, an instruction to resume the suspended radio connection, using the third security key.

Aspect 27. The method of any of aspects 12-26, wherein generating the new security key for communicating with the MN or the SN includes generating an integrity protection key $K_{RRCint}$ for use with radio resource control (RRC) data transmitted over a signaling radio bearer (SRB).

Aspect 28. The method of any of aspects 12-26, wherein generating the new security key for communicating with the MN or the SN includes generating an encryption key $K_{RRCenc}$ for use with RRC data transmitted over an SRB.

Aspect 29. The method of any of aspects 12-26, wherein generating the new security key for communicating with the MN or the SN includes generating an encryption key $K_{UPenc}$ for use with user-plane data transmitted over a data radio bearer (DRB).

Aspect 30. A radio access network (RAN) comprising: a first base station coupled to a core network (CN); and a second base station communicatively coupled to the CN and the first base station; the RAN configured to implement a method of any of aspects 13-20.

Aspect 31. The method of claim 1, further comprising communicating with the SN using the fourth security key via the MN.

Aspect 32. The method of aspect 1, wherein performing the procedure for transitioning from the inactive state to the connected state is in response to detecting data to be transmitted.

Aspect 33. The method of aspect 1, wherein performing the procedure for transitioning from the inactive state to the connected state is in response to receiving a paging notification from the MN.

Aspect 34. The method of any of aspects 1-10, further comprising, prior to transitioning to the inactive state: generating the first security key based at least on a previous RAN key $K_{MN}$ corresponding to the MN; and generating the second security key based at least on a previous RAN key $K_{SN}$ corresponding to the SN.

What is claimed is:

1. A security key management method implemented in a user equipment (UE) capable of concurrent communication with a master node (MN) and a secondary node (SN), the method comprising:
   transitioning, from a connected state in which the UE communicates with the MVN using a first security key and with the SN using a second security key, to an inactive state in which a radio connection between the UE and a radio access network (RAN) is suspended; and
   performing a procedure for transitioning from the inactive state to the connected state, including:
      receiving, from the MN, a radio resource control (RRC) resume message including a counter value sk-Counter, the sk-Counter is associated with security for a radio bearer terminated at the SN,
      generating a new RAN key $K_{SN}$ corresponding to the SN using (i) the counter value and (ii) a RAN key $K_{MN}$ corresponding to the MN, and
      generating a new security key for communicating with the SN based on at least the new RAN key KSN.

2. The method of claim 1, wherein performing the procedure for transitioning from the inactive state to the connected state further includes:
   generating a new RAN key $K_{MN}$ corresponding to the MN,
   wherein generating the new RAN key $K_{SN}$ using the RAN key $K_{MN}$ corresponding to the MN includes using the new RAN key $K_{MN}$.

3. The method of claim 2, wherein the counter value sk-Counter is associated with an initial configuration of security for a radio bearer terminated at the SN.

4. The method of claim 3, wherein receiving the counter value sk-Counter from the MN is in response to a request from the UE to resume the radio connection.

5. The method of claim 2, wherein the new security key is a fourth security key, the method further comprising:
   generating a third security key for communicating with the MN based at least on the new RAN key $K_{MN}$.

6. The method of claim 5, wherein generating the third security key is in response to detecting at least one of:
   (i) an initiation of a procedure for resuming the radio connection between the UE and the RAN, or
   (ii) a notification from the MN that the radio connection is inactive.

7. The method of claim 5, further comprising:
   receiving, from the MN, a data unit including an instruction to resume the suspended radio connection, using the third security key.

8. The method of claim 1, wherein generating the new security key for communicating with the MN or the SN includes at least one of:
   generating an integrity protection key $K_{RRCint}$ for use with radio resource control (RRC) data transmitted over a signaling radio bearer (SRB),
   generating an encryption key $K_{RRCenc}$ for use with RRC data transmitted over the SRB, or
   generating an encryption key $K_{UPenc}$ for use with user-plane data transmitted over a data radio bearer (DRB).

9. The method of claim 1, wherein the RRC resume message is an RRCConnectionResume message.

10. The method of claim 1, wherein the RRC resume message is an RRCResume message.

11. The method claim 1, further comprising, in response to the RRC Resume message:
   transitioning from the inactive state to the connected state, and transmitting, to the MN, an RRC resume complete message.

12. A security key management method implemented in a radio access network (RAN) that includes a first base station operating as a master node (MN) and a second base station operating as a secondary node (SN), the method comprising:
  causing a UE to transition from a connected state in which the UE communicates with the MN using a first security key and with the SN using a second security key, to an inactive state in which a radio connection between the UE and the RAN is suspended;
  subsequently to causing the UE to transition to the inactive state, generating, by the processing hardware, a new RAN key $K_{MN}$ corresponding to the MN;
  transmitting, to the UE, a radio resource control (RRC) resume message including a counter value sk-Counter, the sk-Counter is associated with security for a radio bearer terminated at the SN;
  generating a new RAN key $K_{SN}$ corresponding to the SN, based on at least the new RAN key $K_{MN}$; and
  generating, a new security key for communicating between the UE and the SN, based on at least the new RAN key KSN.

13. The method of claim 12, wherein generating the new RAN key $K_{MN}$ is in response to receiving, from the UE, a request to resume the suspended radio connection.

14. The method of claim 12, wherein:
  causing the UE to transition to the inactive state includes transmitting a notification to the UE that the radio connection is inactive; and
  generating the new RAN key $K_{MN}$ is in response to transmitting the notification.

15. The method of claim 12, wherein generating the new RAN key $K_{MN}$ includes at least one of:
  deriving the new RAN key $K_{MN}$ from a previous RAN key $K_{MN}$,
  deriving the new RAN key $K_{MN}$ from a next hop (NH) key associated with a core network (CN), or
  deriving the new RAN key $K_{MN}$ from an Authentication Management Function (AMF) key $K_{AMF}$ associated with an AMF of a serving network.

16. The method of claim 12, wherein generating the new RAN key $K_{SN}$ is based further on the counter value sk-Counter, the counter value sk-Counter being associated with an initial configuration of security for a radio bearer terminated at the SN.

17. The method of claim 12, further comprising:
  transmitting, from the MN to the SN, the new RAN key $K_{SN}$, and
  subsequently to transmitting the new RAN key $K_{SN}$ to the SN, transmitting, from the MN to the UE, an instruction to resume the suspended radio connection.

18. A device including one or more processors and configured to:
  transition from a connected state in which the UE communicates with the MN using a first security key and with the SN using a second security key, to an inactive state in which a radio connection between the UE and a radio access network (RAN) is suspended; and
  perform a procedure for transitioning from the inactive state to the connected state, including:
    receive, from the MN, a radio resource control (RRC) resume message including a counter value sk-Counter, the sk-Counter is associated with security for a radio bearer terminated at the SN,
    generate a new RAN key $K_{SN}$ corresponding to the SN using (i) the counter value and (ii) a RAN key $K_{MN}$ corresponding to the MN, and
    generate a new security key for communicating with the SN based on at least the new RAN key KSN.

19. The device of claim 18, wherein the RRC resume message is an RRCConnectionResume message.

20. The device of claim 18, wherein the RRC resume message is an RRCResume message.

* * * * *